(12) United States Patent
Suzuki (10) Patent No.: US 6,661,874 B2
(45) Date of Patent: Dec. 9, 2003

(54) X-RAY IMAGE DIAGNOSTIC APPARATUS (75) Inventor: Katsumi Suzuki, Kashiwa (JP)

(73) Assignee: Hitachi Medical Corporation, Tokyo (JP)

(*) Notice: Subject to any disclaimer, the term of this patent is extended or adjusted under 35 U.S.C. 154(b) by 0 days.

(21) Appl. No.: 10/182,614

(22) PCT Filed: Feb. 1, 2001

(86) PCT No.: PCT/JP01/00700
§ 371 (c)(1),
(2), (4) Date: Sep. 25, 2002

(87) PCT Pub. No.: WO01/56473
PCT Pub. Date: Aug. 9, 2001

(65) Prior Publication Data
US 2003/0118153 A1 Jun. 26, 2003

(30) Foreign Application Priority Data
Feb. 1, 2000 (JP) .......................... 2000-024318

(51) Int. Cl.[7] .................................. H05G 1/64
(52) U.S. Cl. ...................... 378/98.8; 378/98.2
(58) Field of Search .................. 378/98.2–98.12; 250/370.09

(56) References Cited
U.S. PATENT DOCUMENTS
6,282,261 B1 * 8/2001 Mazess et al. ............ 378/98.3
* cited by examiner Primary Examiner—Craig E. Church
(74) Attorney, Agent, or Firm—Antonelli, Terry, Stout & Kraus, LLP (57) ABSTRACT

Time for readout with no recording is shortened by performing readout with no recording only to the pixels having lags of the previous image. Also, a flat panel detector for receiving X-ray that has transmitted through an object to be examined, outputting an X-ray image, image memorizing means for memorizing said X-ray image, display means for displaying the X-ray image, a console for sending a start signal to read out the image and sending the threshold for extraction of the particular pixels to which readout with no recording is performed, readout control means for controlling readout of the image data of the flat panel detector 11, previous image memorizing means for memorizing image data of the previous image of the flat panel detector and overwriting image data of the particular pixels to which readout with no recording has been performed, and readout address determining means for extracting the particular pixels according to said threshold within image data of previous image memorizing means and determining its address are comprised to obtain an image having no artifact. And readout control means controls readout of the flat panel detector so as to perform readout with no recording only to the particular pixels of which the address is determined.

15 Claims, 4 Drawing Sheets

THE CENTER PART  X(OR Y)ADDRESS OF THE X-RAY IMAGE

FIG. 6a

THE CENTER PART  X(OR Y)ADDRESS OF THE X-RAY IMAGE

FIG. 6b

X-RAY IMAGE DIAGNOSTIC APPARATUS

FIELD OF INVENTION

The present invention relates to an X-ray image diagnostic apparatus for obtaining an X-ray image of a diagnosed part of an object to be examined by detecting X-ray that has transmitted through the object in a flat panel detector. More particularly, it relates to an X-ray image diagnostic apparatus for obtaining an image that has no motion artifact by removing lags in the flat panel detector.

BACKGROUND OF THE ART

In an X-ray image diagnostic apparatus hitherto, an object to be examined is irradiated with X-ray and the X-ray that has transmitted through the diagnosed part of the object is received with an X-ray detector, such as a flat panel detector (refer to Paul R. Granfors; "Performance Characteristics of an Amorphous Silicon Flat Panel X-ray Imaging Detector." Proc. SPIE Medical Imaging, February 1999. pp. 480–488), and then the X-ray image outputted from said X-ray detector is displayed on a CRT (cathode-ray tube) monitor or the like.

A flat panel detector used in an X-ray image diagnostic apparatus is comprised of a scintillator to transform X-ray that has transmitted through the object into light, a photo diode (an amorphous silicon type, for example) to transform the light outputted from said scintillator into electrical charge. This flat panel detector obtains an X-ray image by reading out electrical charge of the photo diode through a switching element (TFT(Thin Film Transistor), for example).

Figure 5:
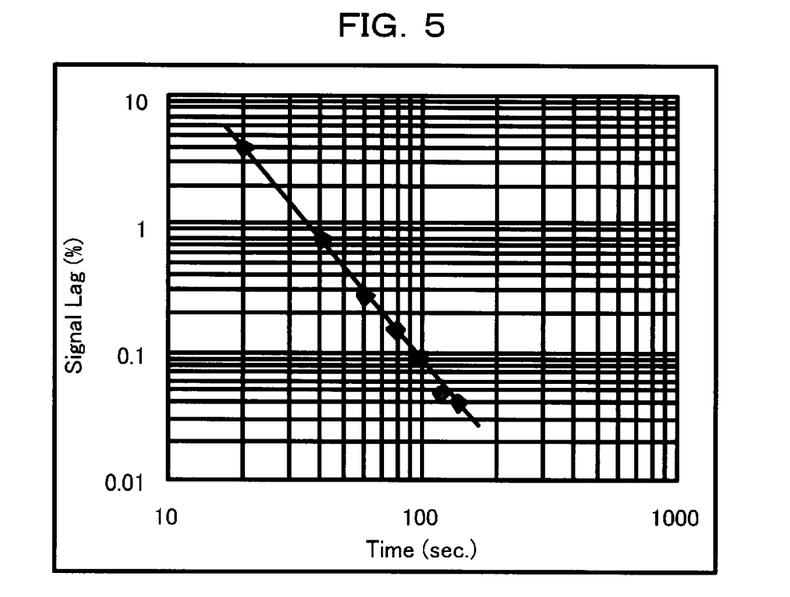
FIG. 5 is an example showing how lags in the flat panel detector decreases along with time.

In the flat panel detector mentioned above, it is known that even after reading out electrical charge from the photo diode, the charge that is not read out remains in the photo diode. FIG. 5 is an example showing how the electrical charge, or the lags, remaining in the photo diode decreases along with time. (For the detail, refer to P. L. Weisfield; "High Performance Amorphous Silicon Image Sensor for X-ray Diagnostic Medical Imaging Applications." Proc. SPIE Medical Imaging, February 1999. pp. 307–317.) As is clear in FIG. 5, the amount of the electrical charge remaining in the photo diode hardly changes in a short time within a second for taking images of fluoroscopy and radiography. Then the remaining charge becomes lags that affect the next image and a motion artifact, which is an obstacle to diagnosis, appears on the image.

For removing the lags of the previous image, the electrical charge remaining in the photo diode of the flat panel detector is read out without memorizing it into an image memorizing means before memorizing the next image from the flat panel detector into the image memorizing means (hereafter, it is referred to as "readout with no recording.")

However, in the conventional art mentioned above, for removing the lags of the previous image, readout with no recording must be performed to all photo diode of the flat panel detector, that is, to all pixels. Then said readout takes as much time as performing readout to one more image.

Also, when there exists a region with an extremely high signal level in an X-ray image, the lags are not sufficiently removed by performing readout with no recording only one time. Then, readout with no recording for several images has to be performed.

Figure 6A:
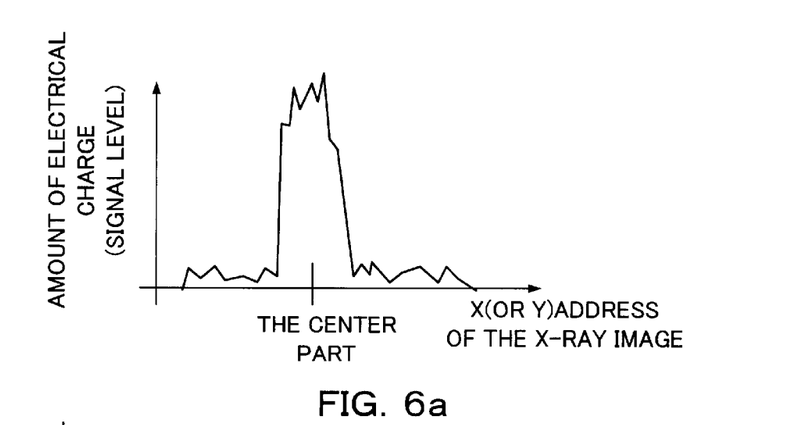
FIG. 6 is a diagram showing change of lags in the flat panel detector between before and after readout with no recording.
Figure 6B:
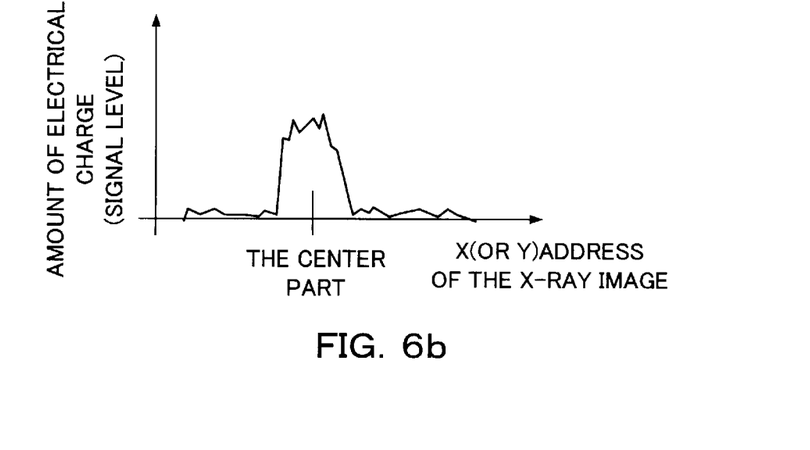

FIG. 6 is a figure for explaining an example of the above case and FIG. 6(a) is an example of a histogram of electrical charge stored in the photo diode of the flat panel detector that has received the X-ray image. In the FIG. 6(a), there exists a region with an extremely high signal level in the center of the X-ray image. FIG. 6(b) shows the histogram of electrical charge stored in the photo diode of the flat panel detector after performing readout with no recording one time to the X-ray image of FIG. 6(a). In said histogram, there still remains a region with a high signal level. Then, for removing the lags of said high signal level part, readout with no recording for several times has to be performed.

The present invention is made concerning said circumstances. The purpose of said invention is to shorten the time for the readout with no recording by performing the readout with no recording only to the pixels having high level lags of the previous image, as well as to provide an X-ray image diagnostic apparatus to obtain an image of high quality by removing motion artifact generated due to said lags.

DISCLOSURE OF THE INVENTION

To achieve said purposes, the X-ray image diagnostic apparatus of the present invention comprises:

an X-ray source for irradiating X-ray to the object to be examined;

a flat panel X-ray detector for detecting X-ray that has transmitted through said object and for generating X-ray image data, said flat panel X-ray detector being arranged opposite to said X-ray source;

image memorizing means for memorizing the X-ray image that is output above as image data;

display means for displaying the image data that is output above as an image;

operation means for outputting the start signal to read out the image; and readout control means for controlling the readout of the X-ray image data from said flat panel X-ray detector when receiving the start signal to read out the image, wherein said operation means comprises means for determining its readout range by the histogram of remaining data after reading out X-ray image data obtained at the previous time phase of the predetermined time phase from said flat panel X-ray detector to said image memorizing means. And said readout control means comprises means for controlling readout of the remaining data in said flat panel X-ray detector from the readout range that is determined above.

And in the X-ray image diagnostic apparatus comprising:

a console for outputting a start signal to read out the image;

a flat panel detector for receiving an image of X-ray that has transmitted through the object to be examined and outputting said X-ray image;

image memorizing means for memorizing an X-ray image outputted from said flat panel detector as image data;

display means for displaying the image data memorized in said image memorizing means as an X-ray image; and readout control means for controlling readout of the X-ray image data from said flat panel detector when receiving the start signal to read out the image outputted from said console, said apparatus further comprises:

previous image memorizing means for memorizing the image data of an X-ray image outputted from said flat panel detector, as well as for performing readout with no recording to the particular pixels of said flat panel detector before said flat panel detector outputs the next image data and overwriting said image data to which readout with no recording has been performed; and readout address determining means for extracting the particular pixels from the image data memorized in said previous image memorizing means and for calculating the address corresponding to the position of said particular pixels and outputting it to said readout control means. Said particular pixels are extracted according to the signal level of the image data, and said readout control means performs control in order to perform readout with no recording only to the particular pixels of said flat panel detector in accordance with the address of the particular pixels inputted from said readout address determining means.

Compared with the conventional X-ray image diagnostic apparatus, the apparatus having said structure, to which previous image memorizing means and readout address determining means is added, can extract the particular pixels to which readout with no recording is performed according to the signal level of the image data, as well as overwrite of the image data that is read out with no recording from the particular pixels of previous image memorizing means. Then, the condition of remaining electrical charge at each pixel in the flat panel detector before and after readout with no recording can be grasped. Besides, as the address of the particular pixels to which readout with no recording is performed can be determined in readout address determining means, readout with no recording only to the particular pixels can be performed through readout control means. Consequently, as readout with no recording is performed only to the particular pixels, time for readout with no recording can be shortened.

Also in the X-ray image diagnostic apparatus of the present invention, the particular pixels of said previous image memorizing means is the pixels having a signal level equal to or above a particular signal level (hereafter referred to as a threshold.) In said structure, among pixels in the flat panel detector the particular pixels to which readout with no recording is performed are extracted by using a particular signal level as the threshold. Then the pixels having a high signal level are read out with no recording. With said readout with no recording, readout of electrical charge begins from pixels having much remaining charge in the flat panel detector. And so remaining charge is efficiently reduced.

Also in the X-ray image diagnostic apparatus of the present invention, extraction of the particular pixels of said previous image memorizing means and readout with no recording of the particular pixels of said flat panel detector are performed for a plural number of time. In said structure, extraction and readout with no recording of the particular pixels is performed in the flat panel detector is executed more than two times if electrical charge remaining in the flat panel detector is not removed sufficiently by executing readout with no recording only one time. Consequently, remaining charge in the flat panel detector is removed sufficiently and efficiently.

Also in the X-ray image diagnostic apparatus of the present invention, the threshold used as a standard for extracting the particular pixels to which readout with no recording after the second time is performed from the image data of said previous image memorizing means is determined from the previous threshold. In said structure, as the threshold for the standard of extracting the particular pixels to which readout with no recording is performed can be determined in relation to the previous threshold, the threshold can be determined easily by, for example, keeping the ratio between the two thresholds. Also, as the threshold is determined in relation to the signal level of the pixels of the flat panel detector, the condition of electrical charge remaining in the flat panel detector can be grasped easily and the remaining charge can be also reduced certainly.

Also in the X-ray image diagnostic apparatus of the present invention, the number of the particular pixels to which readout with no recording is performed is subtracted from the number of pixels for one frame, and the resultant value of said subtraction is used as the particular pixels to which readout with no recording after the second time is performed from the image data of said previous image memorizing means. In said structure, readout with no recording can be performed two times while reading out the image data for one frame. For example, readout with no recording can be performed efficiently by reading out pixels having a signal level equal to or above the threshold in the first readout with no recording and then reading out the image data in descending order of the signal level in the second readout with no recording.

BEST MODE FOR CARRYING OUT THE INVENTION

Hereafter, an embodiment of the X-ray image diagnostic apparatus of the present invention will be explained using the attached drawings.

Figure 1:
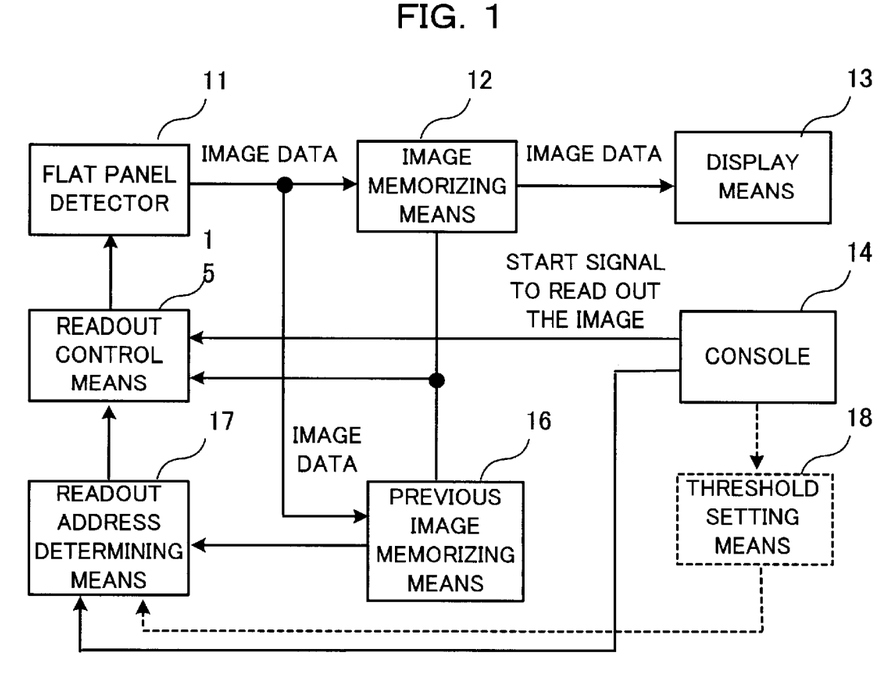
FIG. 1 is a block diagram showing an embodiment of the X-ray image diagnostic apparatus of the present invention.

FIG. 1 is a block diagram showing one embodiment of an X-ray image diagnostic apparatus of the present invention.

In FIG. 1, the X-ray image diagnostic apparatus of the present invention comprises:

a flat panel detector (a two-dimensional detector)11 for receiving X-ray that has transmitted through an object to be examined (not described in the figure) and outputting an X-ray image;

image memorizing means 12 for memorizing an X-ray image outputted from the flat panel detector 11 as image data;

display means 13 for displaying the image data memorized in the image memorizing means 12 on a monitor;

a console 14 where an operator send readout control means 15 a start signal to read out the image of the flat panel detector 11;

readout control means 15 for controlling readout of the image data of the flat panel detector 11 when receiving the start signal to read out the image from the console 14;

previous image memorizing means 16 for memorizing the image data memorized in image memorizing means 12, as well as overwriting the image data only of the particular pixels to which readout with no recording has been performed on said memorized image data after the image data outputted from the flat panel detector 11 by the control signal of said readout control means 15 is memorized in image memorizing means 12; and readout address determining means 17 for performing readout with no recording only to the particular pixels of the flat panel detector 11 by extracting only the particular pixels within the image data memorized in the previous image memorizing means 16, and calculating the address corresponding to the position of those particular pixels, and then outputting the address of the particular pixels to readout control means 15.

The characteristic of the present invention relates to the method of performing readout with no recording to the image data in the flat panel detector 11. And the elements concerning readout of the image data in the flat panel detector 11 in FIG. 1 are the flat panel detector 11, previous image memorizing means 16, readout address determining means 17 and readout control means 15. Hereafter, the details of these elements will be explained.

First, the flat panel detector 11 comprises a flat plate-shaped scintillator and a photo diode array, as mentioned in the background of the art. And electrical charge in the photo diode is read out through a switching element. When an X-ray image is taken to the flat panel detector 11, electrical charge corresponding to the X-ray dose histogram of the X-ray image is stored in each element of the photo diode array in the flat panel detector 11. Therefore, each element of the photo diode array corresponds to each pixel of the X-ray image and electrical charge stored in each element of the photo diode array corresponds to the pixel level. Here, it substantially corresponds to the amount of electrical charge that is read out from the photo diode through the switching element as image data because it takes time to read out electrical charge stored in the photo diode completely.

Readout control means 15 performs the first readout control of image data of the flat panel detector 11 when receiving the start signal to read out the image from the console 14. The first image data that is read out is output to image memorizing means 12 and previous image memorizing means 16. The image data outputted to image memorizing means 12 is memorized at this point and is displayed on display means 13 to be used for medical diagnosis. The first image data outputted to previous image memorizing means 16 is memorized at this point and is used for extraction of the particular pixels.

Besides, readout control means 16 performs the second readout, that is, readout with no recording of the image data only to the particular pixels of the flat panel detector 11 according to the address information of the particular pixels determined in readout address determining means 17, and then outputs to previous image memorizing means 16. At this time, the second image data is not output to image memorizing means 12. In previous image memorizing means 16, the second image data of the particular pixels is overwritten on the first image data.

Previous image memorizing means 16 is used for extracting the particular pixels to which readout with no recording is performed after memorizing the first image data under the control of readout control means 15. After the particular pixels are extracted, previous image memorizing means 16 memorizes the second image data of these particular pixels. The image data of each time stored in previous image memorizing means 16 is used for extracting the particular pixels to which readout with no recording is performed next.

Readout address determining means 17 extracts the particular pixels according to the image data memorized in previous image memorizing means 16 and determines readout address of the extracted particular pixels to output to readout control means 15.

Extraction of the particular pixels is usually performed according to the image data, or the signal level, corresponding to electrical charge stored in the photo diode of the flat panel detector 11. As said signal level becomes larger, the lags also become larger. Therefore a predetermined signal level is set as a signal level threshold (hereafter referred to as a threshold) to extract pixels having a signal level equal to or above said threshold as the particular pixels.

Said threshold can be set directly at the console 14 as shown by the actual line in FIG. 1. And it can be also set by separately providing threshold setting means 18 as shown by the broken line in FIG. 1. When the latter method is used, the threshold can be set by providing a threshold table in threshold setting means 18 and making said threshold setting means 18 select a threshold within the table, or by providing expressions in threshold setting means 18 and making said threshold setting means 18 select a parameter. Also, the function of said threshold setting can be provided in readout address determining means 17 that extracts the particular pixels using the threshold.

Extraction of the particular pixels is performed possibly one time or more than two times. At the first extraction, the threshold is usually set with a signal level. But after the second time, the threshold is not necessarily set with a signal level. It might be set with other items, for example, the number of pixels.

When a threshold is set with a signal level and this signal level is high, the number of the particular pixels decreases, and so time for readout is shortened. But, in this case, lags increase and readout with no recording has to be performed many times. And if the threshold is set with a low signal level, the number of the particular pixels increases, and so time for readout is prolonged. Then readout with no recording is not performed efficiently. Therefore, the method for setting the threshold is important. In said embodiment, the value that the max signal level in the previous image data is multiplied with a constant rate is set as the threshold.

Next, the X-ray image diagnostic apparatus of the present invention in one embodiment shown in FIG. 1 will be explained. First, as modes for taking X-ray images, the fluoroscopy mode and the radiography mode are used. In the fluoroscopy mode, an image of an object to be examined is taken with low X-ray dose to determine the position for radiography mode and the X-ray image is read out continuously from the flat panel detector 11, and then the image is displayed as a dynamic image on display means 13, such as a monitor. Compared with it, in the radiography mode, a clear image having a few noise elements is captured with a comparatively high X-ray dose at the position for imaging the object determined in the fluoroscopy mode, and the X-ray image is read out from the flat panel detector 11. In said fluoroscopy mode, for example, 30 frames of the X-ray image are read out per second from the flat panel detector 11 and are displayed on the display means 13.

After irradiating X-ray to the object, the operator inputs the start signal to read out the X-ray image from the console 14 to readout control means 15. Then the X-ray image is output from the flat panel detector 11 receiving X-ray that has transmits through the object and is memorized in image memorizing means 12.

Now, the case where the radiography mode is changed to the fluoroscopy mode will be considered. In the radiography mode, the image data of the X-ray image outputted from the flat panel detector 11 is memorized in image memorizing means 12. And then said image data is also memorized in previous image memorizing means 16. Here, as the signal level of the image data (the image data of the X-ray image in the radiography mode) memorized in previous image memorizing means 16 becomes higher, the lags that appear in the X-ray image displayed on display means 13 become larger after changing to the fluoroscopy mode.

Then, readout address determining means 17 finds out pixels having a signal level equal to or above the threshold within image data memorized in previous image memorizing means 16 and determines these pixels as the particular pixels to which readout with no recording is performed. The determined address is sent to readout control means 15. Here, the operator determines the threshold in advance considering characteristics of the lags shown in FIG. 5 or the time for changing from the radiography mode to the fluoroscopy mode, and sends the threshold from the console 14 (or threshold setting means 18) to readout address determining means 17.

Readout control means 15 performs readout (readout with no recording) of the image data from the flat panel detector 11 according to the address of the particular pixels to which readout with no recording is performed that is sent from readout address determining means 17, as well as overwrites the image data that is read out in previous image memorizing means 16.

If the start signal to read out the X-ray image in the fluoroscopy mode is not promptly input from the console 14 after finishing readout with no recording, that is, if there is time until changing to the fluoroscopy mode in the next time phase, the second readout with no recording is performed using the image data that is memorized in previous image memorizing means 16 and overwritten in the first readout with no recording. As the threshold for determining the address of the particular pixels to which the second readout with no recording is performed, a new threshold is set in the console 14 or in threshold setting means 18 according to the threshold (a particular level) used in the first readout with no recording, and said new threshold is sent to readout address determining means 17. The method for setting said new threshold will be explained later.

Said process of readout with no recording is repeated until the start signal to read out the X-ray image in the fluoroscopy mode is input from the console 14. By repeating the process, readout with no recording is performed only to the particular pixels for shortening the time for it, as well as readout with no recording can be performed to the broader range of image data when there is time until the other mode is input from the console 14.

Figure 2:
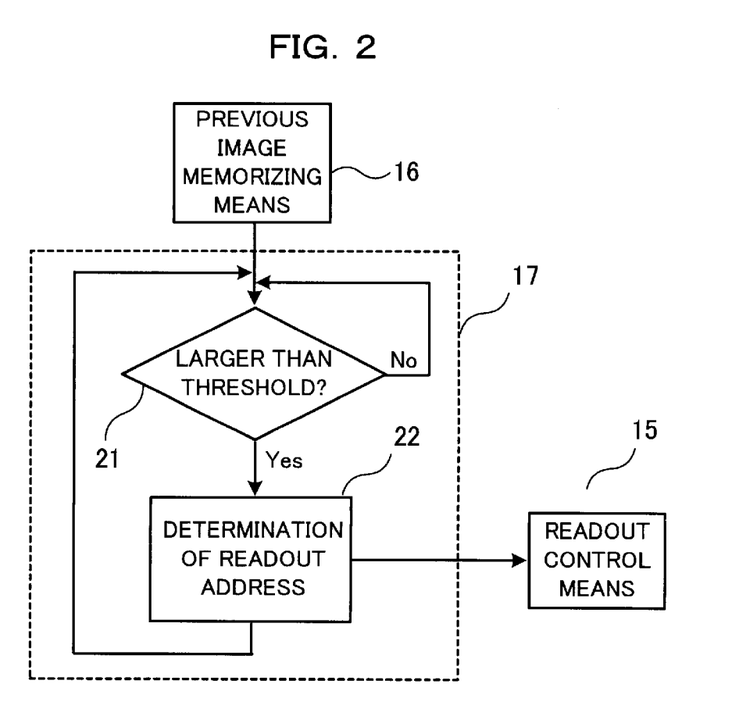
FIG. 2 is a flow chart for explaining the process of finding out the pixels having a signal level equal to or above the threshold among the image data memorized in previous image memorizing means 16 as the particular pixels to which readout with no recording is performed.

Next, an example of operation of readout address determining means 17 will be explained using FIG. 2. FIG. 2 is a flow chart for explaining the process in readout address determining means 17 of finding out pixels having a signal level equal to or above the threshold as the particular pixels to be read out with no recording within the image data memorized in previous image memorizing means 16.

In FIG. 2, the image data memorized in previous image memorizing means 16 is read out one pixel at a time by the judging block 21 in readout address determining means 17. In the judging block 21 the image data of the read pixels is compared with the predetermined threshold. If the image data of the pixels that is read out from previous image memorizing means 16 is larger than the threshold in process block 22, it is determined that said address of the pixels is used as the address of the particular pixels and is sent to readout control means 15. Readout address determining means 17 performs said process repeatedly as many times as the number of pixels of the image data memorized in previous image memorizing means 16.

Next, an example of a method of determining the threshold in the second readout with no recording will be explained.

The threshold T1 in the second readout with no recording is set as a new threshold by the console 14 or threshold setting means 18 according to the threshold used in the first readout with no recording and is sent to readout address determining means 17. Given that the threshold in the first readout with no recording is T and the rate of remaining electrical charge after reading out charge to the stored charge in the photo diode of the flat panel detector 11 is W %, the threshold T1 that is newly set in the second readout with no recording is expressed with the expression below:

$$T1=T\times(W/100) \qquad (1)$$

Figure 3A:
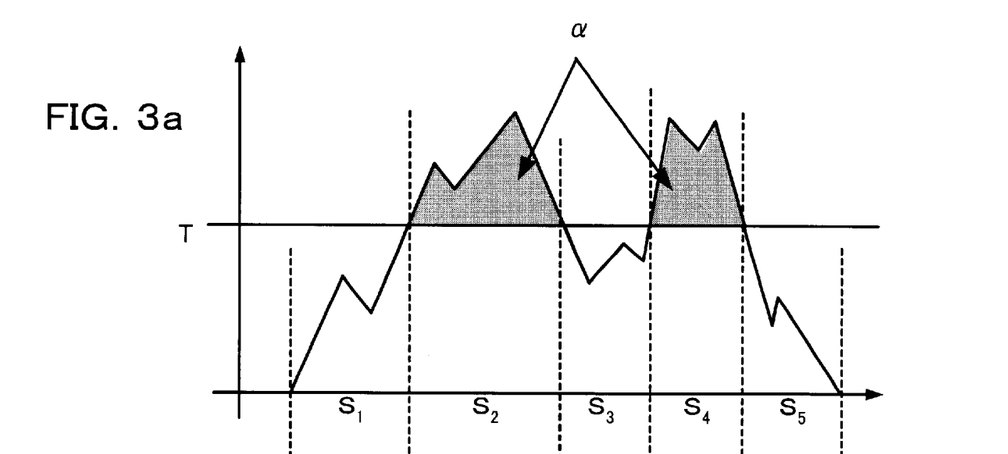
FIG. 3 is a schematic diagram for explaining relation between the threshold in readout with no recording and the image data memorized in previous image memorizing means 16.

FIG. 3 is a schematic diagram for explaining the relation between the threshold in readout with no recording and the image data memorized in previous image memorizing means 16. FIG. 3($a$) shows a histogram of any line of the image data memorized in previous image memorizing means 16 before readout with no recording. In FIG. 3($a$), the address of the particular pixels corresponding to region α (region S2 and S4) equal to or above the predetermined threshold T is determined in readout address determining means 17, and to each particular pixel readout with no recording is performed by readout control means 15 according to said address.

Figure 3B:
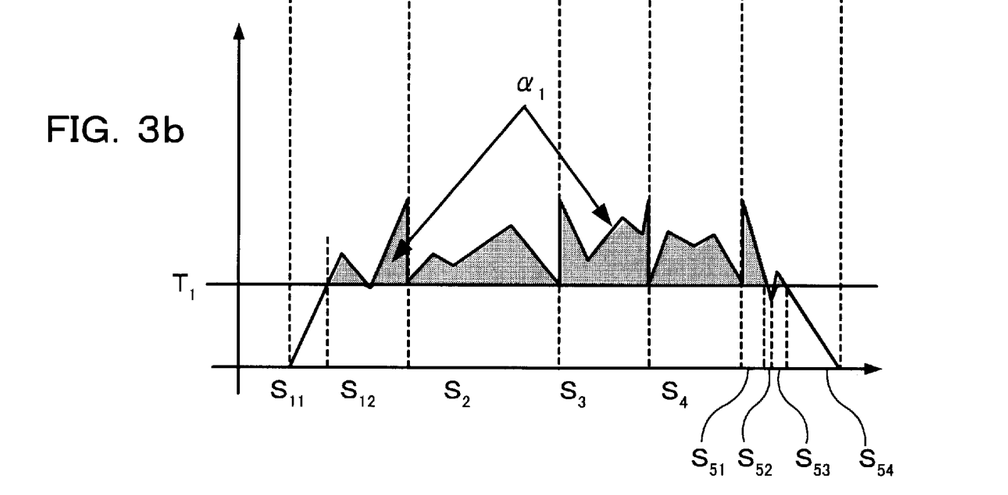

FIG. 3($b$) shows a histogram of any line of the image data memorized in previous image memorizing means 16 after performing readout with no recording. Because the particular pixels that have been read out with no recording is overwritten in previous image memorizing means 16, in the image data after readout with no recording memorized in previous image memorizing means 16 shown in FIG. 3($b$), the image data of the particular pixels in regions S2 and S4 to which readout with no recording is performed have W % of the first signal level. And the image data of pixels in regions S1, S3 and S5 to which readout with no recording is not performed have the same signal level as the first signal level (equal to or below the threshold T).

Here, the console 13 or threshold setting means 18 sets a new threshold T1(=T×(W/100)) according to the expression (1) and readout address determining means 17 determines the address of the particular pixels corresponding to the region a (region S12, S2, S3, S4, S51 and S53) equal to or above said new threshold T1. And then readout control means 15 performs the second readout with no recording according to said address.

When readout with no recording is performed repeatedly, the threshold after the third readout with no recording (T2, T3 . . . ) can be set as T2=T1×(W/100) in the same way as the threshold T1(=T×(W/100)) of the above second readout with no recording.

Next, another example of the method of determining the threshold in the second readout with no recording in performing readout with no recording repeatedly will be explained. This example is to finish the first and the second readout with no recording within the same time of reading out one image from the flat panel detector 11. According to this, for example, given that the total number of the image data to be read out from the flat panel detector 11, that is, the number of pixels for an image is N and the number of the image data that is overwritten on previous image memorizing means 16 in the first readout with no recording is n1, the number n2 of the image data to which the second readout with no recording is performed is expressed with the expression below:

$$n2 = N - n1 \quad (2)$$

The threshold T1 in the second readout with no recording is used as a signal level in the n2th pixel in arranging the image data memorized in previous image memorizing means 16 at finishing the first readout with no recording in order of height of the signal level. Therefore, said threshold T1 is not determined automatically as in the expression (1) and it has to be found out within the image data memorized in previous image memorizing means 16.

Figure 4:
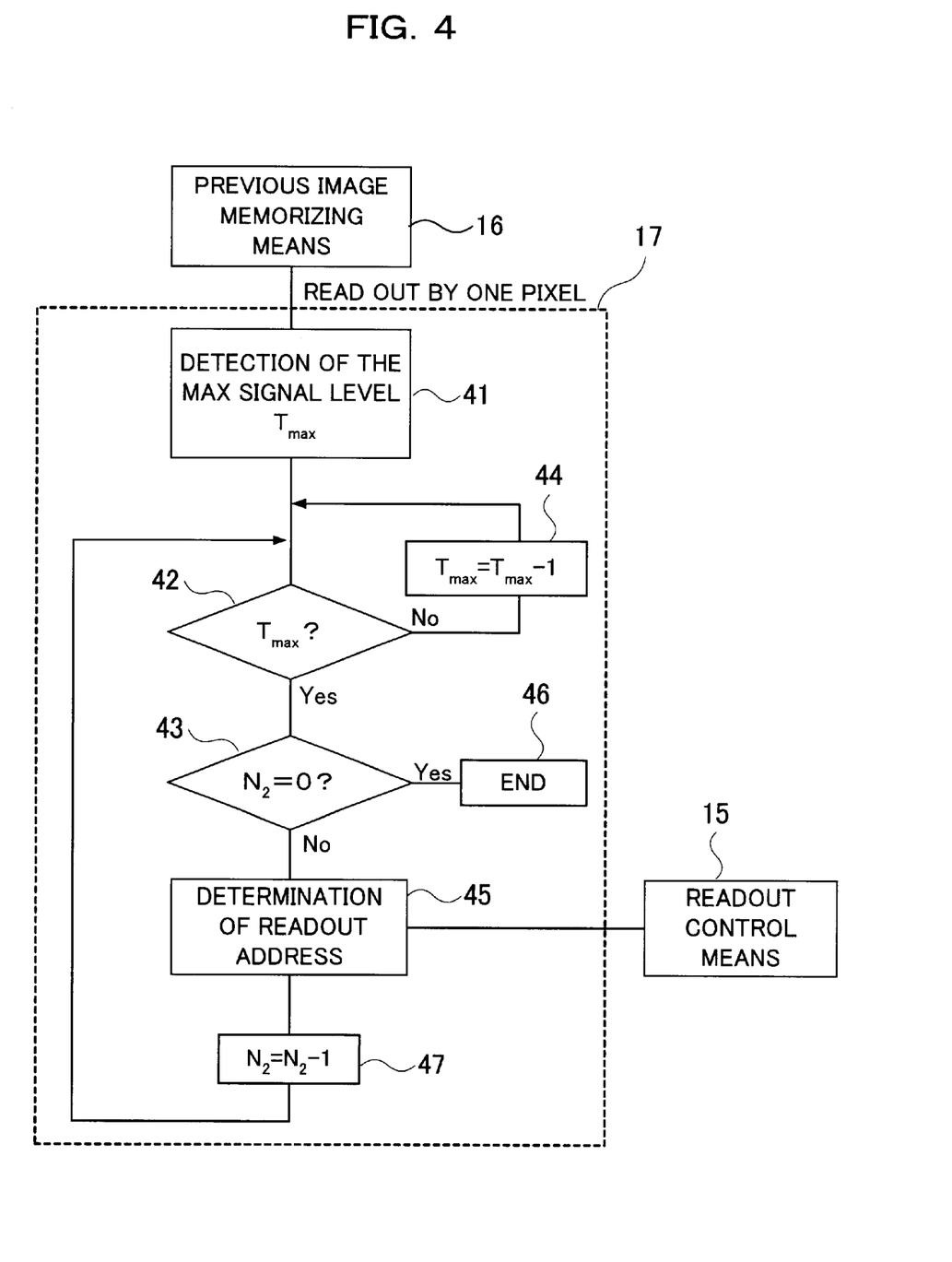
FIG. 4 is a flow chart for explaining the process of finding out the address of the particular pixels to which the second readout with no recording is performed in readout address determining means 17.

Here, the process of determining the address of pixels to which the second readout with no recording is performed using the threshold in said example in readout address determining means 17 will be explained. FIG. 4 is a flow chart for explaining the process of finding out the address of the particular pixels to which the second readout with no recording is performed in readout address determining means 17.

In FIG. 4, the image data that is overwritten with the image data of readout with no recording after finishing the first readout with no recording is memorized in previous image memorizing means 16. At first, in the process block 41 the max signal level, Tmax is detected within the image data in previous image memorizing means 16. Next, in the judging block 42 the image data that is read out from previous image memorizing means 16 is compared with said max signal level Tmax. When they have the same value, said image data is sent to the next judging block 43. If value of the image data that is read out from previous image memorizing means is different from said max signal level Tmax, the value Tmax of the max signal level is modified in the process block 44.

Next, in the judging block 43 it is judged whether the sent image data is included in the number n2 of the image data to which the second readout with no recording is performed or not. When it is included in the number n2 of image data to which readout with no recording is performed, the address of previous image data is determined as the address of the particular pixels to which readout with no recording is performed in the process block 45 and is sent to readout control means 15. But when the sent image data is not included in the number n2 of the image data to which readout with no recording is performed, (or the sent data is over n2,) the process of finding out the address of the particular pixels to which readout with no recording is performed is finished in the process block 46. Said process is performed repeatedly in the process block 47 until the number of pixels to which readout with no recording is performed reaches n2.

In said example, the case of performing readout with no recording only within the time of reading out one image of the flat panel detector 11 has been explained. However, for example, if there is interval for several images between radiography and the next radiography and the time of the interval is grasped as in the angiography, it is preferable to repeat said process by setting conditions so as to repeat readout with no recording for a certain number of times that is predetermined, or to set all the image data memorized in previous image memorizing means 16 to be below the desired value Tmax. Here, the desired value Tmax is determined as a signal level that lags do not affect the next image.

Besides, although in said embodiment the case that the time phase is changed from the radiography mode to the fluoroscopy mode has been explained, the present invention is of course applicable to in changing from the fluoroscopy mode to the radiography mode, in the interval until the next image is read out in reading more than two X-ray images with the radiography mode and in the interval between the fluoroscopy mode and the radiography mode.

Also, although in said embodiment the case that image memorizing means and previous image memorizing means are set as separate memorizing means has been explained, it is of course possible to construct the apparatus so as to use a part of image memorizing means as previous image memorizing means.

As explained above, according to the present invention it is possible to select only the pixels having high level lags and to readout with no recording to them. Therefore, the X-ray image diagnostic apparatus that can shorten the time for readout with no recording can be provided.

What is claimed is:

1. An X-ray image diagnostic apparatus comprising:
   an X-ray source for irradiating X-ray to an object to be examined;
   a flat panel X-ray detector for detecting X-ray that has transmitted through said object and for generating X-ray image data, said flat panel X-ray detector being arranged opposite to said X-ray source;
   image memorizing means for memorizing an X-ray image as image data;
   display means for displaying the image data as an image;
   operation means for outputting a start signal to read out the image; and
   readout control means for controlling readout of the X-ray image data from the flat panel X-ray detector when receiving the start signal to read out the image outputted,
   wherein said operation means comprises means for determining its readout range by means of the histogram of remaining data after reading out X-ray image data obtained in the previous time phase of the predetermined time phase from said flat panel X-ray detector to said image memorizing means, and said readout control means comprises means for controlling readout of the remaining data in said flat panel X-ray detector based on the readout range determined.

2. An X-ray image diagnostic apparatus in claim 1, wherein said readout control means reads out said particular pixels from said flat panel detector based on the address information of the particular pixels of X-ray image data remaining in said flat panel detector in the previous time phase of the predetermined time phase determined in said means for determining said readout range.

3. An X-ray image diagnostic apparatus in claim 2, wherein extraction of said particular pixels is performed according to the signal level of X-ray image data remaining in said flat panel X-ray detector.

4. An X-ray image diagnostic apparatus in claim 3, wherein extraction of the particular pixels is performed by setting a predetermined signal level as a signal level threshold (hereafter referred to as a threshold) and extracting pixels having a signal level equal to or above said threshold.

5. An X-ray image diagnostic apparatus in claim 4, wherein threshold setting means is provided and said threshold is set in said threshold setting means.

6. An X-ray image diagnostic apparatus in claim 5, wherein said threshold is set by providing a threshold table in said threshold setting means and making it select a threshold within the table.

7. An X-ray image diagnostic apparatus in claim 5, wherein said threshold is set by providing expressions in said threshold setting means and making it select a parameter.

8. An X-ray image diagnostic apparatus comprising:

an X-ray source for irradiating X-ray to an object to be examined;

a flat panel X-ray detector for detecting X-ray that has transmitted through said object and generating X-ray image data, said detector is arranged opposite to said X-ray source;

image memorizing means for memorizing an X-ray image outputted above as image data, display means for displaying image data memorized above as an image;

operation means for outputting a start signal to read out the image; and readout control means for controlling readout of X-ray image data from said flat panel detector when receiving the start signal to read out the image outputted above, characterized by further comprising:

previous image memorizing means for memorizing image data of an X-ray image outputted from said flat panel detector, as well as for performing readout with no recording to the particular pixels of said flat panel detector before said flat panel detector outputs the next image data and overwriting said image data to which readout with no recording has been performed; and readout address determining means for extracting the particular pixels from the image data memorized in said previous image memorizing means and for calculating the address corresponding to the position of said particular pixels to output it to said readout control means, wherein said particular pixels are extracted regarding the signal level of the image data as a standard, and said readout control means controls so as to perform readout with no recording only to the particular pixels of said flat panel detector according to the address of the particular pixels inputted from said readout address determining means.

9. An X-ray image diagnostic apparatus in claim 2, wherein the particular pixels of said previous image memorizing means are the pixels having a signal level equal to or above a particular value (hereafter referred to as a threshold).

10. An X-ray image diagnostic apparatus in claim 9, wherein threshold setting means is provided to set said threshold in said threshold setting means.

11. An X-ray image diagnostic apparatus in claim 10, wherein said threshold is set by providing a threshold table in said threshold setting means and selecting threshold within the table.

12. An X-ray image diagnostic apparatus in claim 10, wherein said threshold is set by providing expressions in said threshold setting means and selecting a parameters.

13. An X-ray image diagnostic apparatus in claim 8, wherein extraction of the particular pixels of said previous image memorizing means and readout with no recording to the particular pixels of said flat panel detector are performed a plural number of times.

14. An X-ray image diagnostic apparatus in claim 9, wherein the threshold to be a standard for extracting the particular pixels to which readout with no recording after the second time is performed from image data of said previous image memorizing means is determined from the previous threshold.

15. An X-ray image diagnostic apparatus in claim 14, wherein the threshold to be the particular pixels from said previous image memorizing means to which readout with no recording after the second time is performed is calculated by subtracting the number of the particular pixels to which the first readout with no recording is performed from the number of pixels for one frame of the particular pixels to which readout with no recording after the second time is performed.

* * * * *